United States Patent
Serra Lleti

(10) Patent No.: US 12,020,405 B2
(45) Date of Patent: Jun. 25, 2024

(54) METHODS AND SYSTEMS FOR TRAINING CONVOLUTIONAL NEURAL NETWORKS

(71) Applicant: LEICA MICROSYSTEMS CMS GMBH, Wetzlar (DE)

(72) Inventor: Jose Miguel Serra Lleti, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 226 days.

(21) Appl. No.: 17/517,797

(22) Filed: Nov. 3, 2021

(65) Prior Publication Data
US 2022/0138910 A1 May 5, 2022

(30) Foreign Application Priority Data
Nov. 5, 2020 (EP) .................................. 20206050

(51) Int. Cl.
*G06T 5/00* (2024.01)
*G06F 18/214* (2023.01)
*G06T 5/20* (2006.01)
*G06T 5/70* (2024.01)
*G06T 9/00* (2006.01)
*G06V 10/82* (2022.01)

(52) U.S. Cl.
CPC ............. *G06T 5/70* (2024.01); *G06F 18/214* (2023.01); *G06T 5/20* (2013.01); *G06T 2207/10056* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2021/0383548 A1* | 12/2021 | Wilson | G06T 7/11 |
| 2022/0058776 A1* | 2/2022 | Ozcan | G06V 10/7715 |
| 2023/0253003 A1* | 8/2023 | Liu | G10L 13/02 |
| | | | 704/200 |

FOREIGN PATENT DOCUMENTS

| | | | | |
|---|---|---|---|---|
| CN | 109 872 288 A | | 6/2019 | |
| CN | 109872288 | * | 6/2019 | ............ Y02T 10/40 |

OTHER PUBLICATIONS

20206050, European_search_opinion, May 3, 2021 (Year: 2021).*
20206050, European_search_report, May 3, 2021 (Year: 2021).*
Ilesanmi et al. "Methods for image denoising using convolutional neural network: a review", Complex & Intelligent Systems (2021) 7: 2179-2198 (Year: 2021).*
Prasen Kumar Sharma et al.: "Scale-aware Conditional Generative Adversarial Network for Image Dehazing," 2020 IEEE Winter Conference on Applications of Computer Vision (WACV), IEEE, US, Mar. 2020 (Mar. 2020), pp. 2344-2354, XP033771185.

(Continued)

*Primary Examiner* — Randolph I Chu
(74) *Attorney, Agent, or Firm* — LEYDIG, VOIT & MAYER, LTD.

(57) ABSTRACT

A computer-implemented method for training a convolutional neural network includes receiving a captured image. A denoised image is generated by applying the convolutional neural network to the captured image. The convolutional neural network is trained based on a high frequency loss function, as well as the captured image and the denoised image.

13 Claims, 4 Drawing Sheets

(56) References Cited

OTHER PUBLICATIONS

Shorten, Connor and Taghi M. Koshgoftaar: "A survey on Image Data Augmentation for Deep Learning," Journal of Big Data, vol. 6, No. 1, Jul. 6, 2019 (Jul. 6, 2019), XP055796356, Springer, Germany, pp. 1-48.

Kang Guoliang et al.: "PatchShuffle Regularization," arXiv.org, Cornell University, US, Jul. 22, 2017 (Jul. 22, 2017), pp. 1-10, XP055796357.

Kim Byeongjoon et al.: "A performance comparison of convolutional neural network-based image denoising methods: The effect of loss functions on low-dose CT images," Medical Physics, vol. 46, No. 9, Aug. 6, 2019 (Aug. 6, 2019), pp. 3906-3923, XP055796355, American Association of Physicists in Medicine, US.

Hao-Hsiang Yang et al.: "Y-net: Multi-scale feature aggregation network with wavelet structure similarity loss function for single image dehazing," arxiv.org, Cornell University Library, 201 Olin Library Cornell University Ithaca, NY 14853, Mar. 31, 2020 (Mar. 31, 2020), XP081635322, pp. 1-5.

Zhao Hang et al.: "Loss Functions for Image Restoration With Neural Networks," IEEE Transactions on Computational Imaging, vol. 3, No. 1, Mar. 2017 (Mar. 2017), pp. 47-57, XP055796352, IEEE, US.

\* cited by examiner

METHODS AND SYSTEMS FOR TRAINING CONVOLUTIONAL NEURAL NETWORKS

CROSS REFERENCE TO RELATED APPLICATIONS

This application claims benefit to European Patent Application No. EP 20206050.5, filed on Nov. 5, 2020, which is hereby incorporated by reference herein.

FIELD

The present invention relates to methods and systems for training a convolutional neural network.

BACKGROUND

Image denoising is used to process images contaminated by additive noise to achieve both noise reduction while preserving the features of the image. The inventor has identified that additive noise may be introduced when users try to minimize photo bleaching and photo toxicity by minimizing the energy input, which may be achieved by reducing the exposure time or gain at the cost of increasing the amount of noise. In a typical workflow, images are acquired at low exposure time or gain, resulting in low quality images, which may contain noise from electronic sources (e.g. Gaussian noise, salt and pepper noise, and shot noise) or sample dependent high frequency noise due to quantization, sensitivity or heat from camera sensors.

SUMMARY

In an embodiment, the present disclosure provides a computer-implemented method for training a convolutional neural network includes receiving a captured image. A denoised image is generated by applying the convolutional neural network to the captured image. The convolutional neural network is trained based on a high frequency loss function, the captured image and the denoised image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
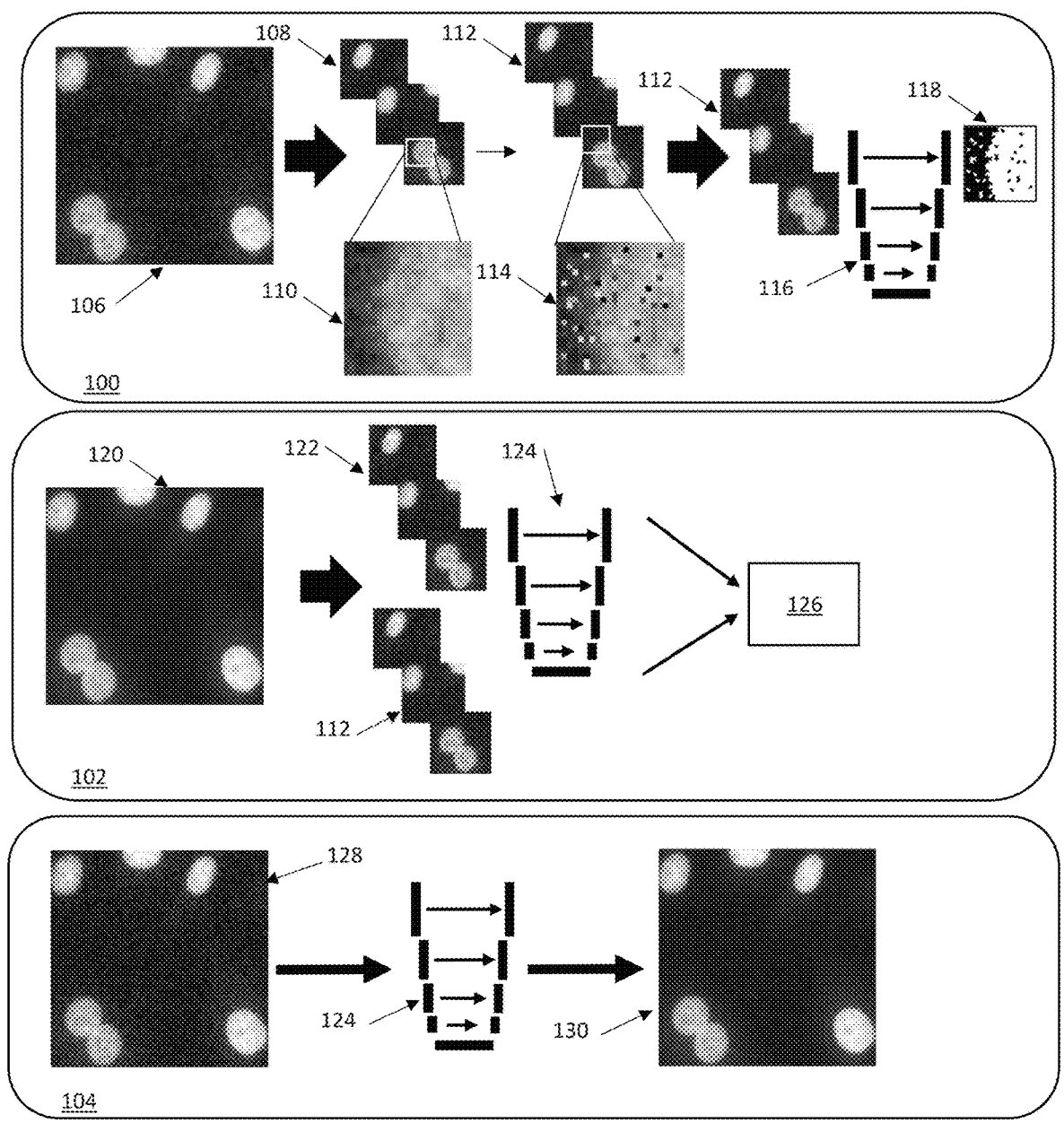
FIG. 1 illustrates a method for training a convolutional neural network according to an embodiment of the invention.

A problem solved by the present invention is how to obtain an image with a higher signal-to-noise ratio (SNR).

In an embodiment of the invention there is provided a computer implemented method for training a convolutional neural network, comprising: receiving a captured image; generating a denoised image by applying the convolutional neural network to the captured image; and training the convolutional neural network based on a high frequency loss function, the captured image and the denoised image. Accordingly, high frequency patterns different from noise and artefacts may be reinjected, and the SNR may be increased.

In a possible implementation of the embodiment, training the convolutional neural network comprises minimising a loss of the convolutional neural network together with a loss of the high frequency loss function. Thus, the SNR may be increased since a greater amount of noise may be masked whilst maintaining more high frequency patterns of the acquired image.

In a possible implementation of the embodiment the high frequency loss function comprises a high pass filter function for applying to the captured image and the denoised image. This enables high frequency patterns of the acquired image which may be otherwise identified as noise, and subsequently masked, to be reinjected.

In a possible implementation of the embodiment training the convolutional neural network comprises training the convolutional neural network to recognize patterns absent from the denoised image and present in the captured image. This enables patterns, such as high frequency patterns, to be recognized which may otherwise be masked from the acquired image.

In a possible implementation of the embodiment the loss function comprises a Laplacian of Gaussian function. Other possible high-pass filtering functions include, Difference of Gaussians (DoG), Difference of Boxes (DoB), Wavelet filtering, Sobel filtering, Gabor filtering, or other gradient or phase congruency filters.

In a possible implementation of the embodiment applying Gaussian smoothing to the captured image and the denoised image before applying the Laplacian of Gaussian function. Alternatives to Gaussian smoothing include average filtering (e.g. weighting by average pixels), bilateral filtering, non-local means (NLM) smoothing, and block-matching and 3D filtering (BM3D).

In a possible implementation of the embodiment the method comprises applying the trained convolutional neural network to the captured image.

In a possible implementation of the embodiment the convolutional neural network is an encoder-decoder convolutional neural network.

In a possible implementation of the embodiment training the convolutional neural network comprises: dividing the captured image and the denoised image in to random patches; swapping pixel values in each random patch with neighbour pixel values; and training the convolutional neural network based on the random patches of the captured image comprising swapped pixel values and the denoised image comprising swapped pixel values.

In a possible implementation of the embodiment the convolutional neural network was trained by: dividing the captured image in to random patches; swapping pixel values in each random patch with neighbour pixel values; and training the convolutional neural network based on the random patches of the captured image comprising swapped pixel values.

In a possible implementation of the embodiment the convolutional neural network was trained by minimising a mean squared error of a convolutional neural network based on the random patches of the captured image comprising swapped pixel values.

In a further embodiment of the invention there is provided a system comprising one or more processors and one or more storage devices, wherein the system is configured to perform the methods described above.

In a possible implementation of the embodiment the system comprises an imaging device coupled to the processor for acquiring microscopy images.

In a further embodiment of the invention there is provided a trained convolutional neural network trained by receiving captured images; generating a denoised image by applying a convolutional neural network to the captured images; and adjusting the convolutional neural network based on a high frequency loss function, the captured image and the denoised image to obtain the trained convolutional neural network.

In a further embodiment of the invention there is provided a computer program with a program code for performing the methods described above.

The inventor has recognized that denoised images using known methods often lose high frequency information, which may result in an image looking more blurred than an original image, and often lose small details. The inventor has also recognized that by applying a high pass filter, a denoised image can be compared with an original noisy image, and a neural network can be trained to recognize patterns missing in the denoised imaged, but present in the original noisy image. These patterns are details from imaged objects and not from noise or other artefacts. In other words, the inventor has recognized that reinjecting high frequency patterns different from noise and artefacts can reinforce edges on small details. The method described herein enhances the SNR (based on peak signal-noise-to-ratio (PSNR) and structural similarity index measure (SSIM)) when applied to known denoising methods.

FIG. 1 illustrates a method for training a convolutional neural network according to an embodiment of the invention. The convolutional neural network forms part of an on-the-fly training system, which may be pretrained by a manufacturer, but is trained during its application at a customer. The pretraining performed by the manufacturer may include the application of the method of embodiments of the invention. A convolutional neural network is a form of machine learning algorithm or model.

In FIG. 1, there are three overall process steps. These steps are pertaining 100, training 102 and processing 104.

In step 100, a convolution neural network is pretrained using several microscopy images, for example. Step 100 may be performed by the manufacturer and/or the customer. A captured image 106 is acquired and cropped or divided into random patches 108. These patches 108 are typically square and represent sections of the acquired image 106 and each patch may overlap with neighbouring patches. The size of each patch is determined based on the size of the image and the processing power of the image processing device used, and might be up to 256×256 pixels, for example. A typical patch might be 64×64 pixels such that a 512×512 pixel image would be divided into 64 patches. Some pixels are selected from each random patch 108 using a uniform random distribution and the pixel values of the selected pixels are swapped or replaced by values from neighbouring pixels to produce random patches of the captured image comprising swapped pixel values 112. Generally, between 1 and 10% of the pixels may be swapped or replaced within the patches. Image 110 illustrates a magnified section of one of the random patches 108 and image 114 illustrates a magnified section of one of the random patches of the captured image comprising swapped pixel values 112.

The random patches of the captured image comprising swapped pixel values 112 are subsequently used to pretrain a convolutional neural network (CNN) 116, so as to obtain a segmentation mask 118 for denoising images. In this example, a U-net is trained, although it will be appreciated that other contracting-expanding, or encoder-decoder CNNs might be used such as a Resnet (e.g. resnet-18). In particular, a dynamic U-net (encoder resnet-18) with sub-pixel convolution (Pixel shuffle) in the merge layer may be used. Furthermore, the convolutional neural network in this example is based on an estimation of the pixel probability, for example, and minimising a mean squared error of the convolutional neural network.

Step 100 is repeated for several acquired microscopy images.

In step 102, the pretrained convolutional neural network from step 100 is trained based on a high frequency loss function, the captured image and the denoised image. Step 102 may be performed by the manufacturer and/or the customer. An image 120 is obtained by applying the CNN 116 to the acquired image 106, which may be referred to as a denoised image 120. The process described in step 100 is repeated in step 102 for both the captured image 106 and the denoised image 120. Namely, dividing the captured image 106 and the denoised image 120 into random patches and swapping, or replacing pixel values in each random patch with neighbour pixel values to obtain random patches of the captured image comprising swapped pixel values 112 and random patches of the denoised image comprising swapped pixel values 122.

The CNN 116 is trained based on the random patches of the captured image comprising swapped pixel values 112 and random patches of the denoised image comprising swapped pixel values 122, and a high frequency loss function. The loss function used in the present example can be represented as:

HFEN loss: $L=\alpha \|HP(x-F(x))\|^2$ where alpha is a value between zero and one which increases towards one with the number of epochs, F(x) is the random patches of the denoised image comprising swapped pixel values 122, x is the random patches of the captured image comprising swapped pixel values 112. HP is a high pass filter. For example, the high pass filter is a Laplacian of Gaussian function, second derivative. Gaussian smoothing may also be applied to the images before being used to train the CNN 116. Alternatives to Gaussian smoothing include average filtering (e.g. weighting by average pixels), bilateral filtering, non-local means (NLM) smoothing, and block-matching and 3D filtering (BM3D). In this example, a Laplacian of Gaussian function is used for high-pass filtering, but other high-pass filters include Difference of Gaussians (DOG), Difference of Boxes (DoB), Wavelet filtering, Sobel filtering, Gabor filtering, or other gradient or phase congruency filtering.

The convolutional neural network 116 is trained by minimising the following expression 126:

$$\mathrm{argmin} \sum_{i=1}^{n} -\ln\left(\frac{1}{M}\sum_{m=1}^{M} \alpha\|HP(x-F(x))\|^2 + (1-\alpha)\mathrm{loss}\right)$$

where n is the number of random patches for the current batch, M is the number of pixels masked (i.e. swapped or replaced pixels), alpha is a value between zero and one which increases towards one with the number of epochs, F(x) is the random patches of the denoised image comprising swapped pixel values 122, x is the random patches of the captured image comprising swapped pixel values 112, HP is a high pass filter, and loss is the segmentation map based on the denoised image.

The resulting CNN 124 is trained to minimise the loss of the convolutional neural network together with a loss of the high frequency loss function. By using both the captured image 106 and the denoised image 120, the resulting CNN 124 is capable of recognize patterns absent from the denoised image and present in the captured image. This is because the inventor has identified that high frequency features can sometimes be identified by a CNN as noise, whereas the high pass filter enables these high frequency features not to be identified as noise.

In step 104, the trained CNN 124 is applied to denoise the images used for training or similar images, achieving higher PSNR than the default method for denoising. For example the CNN 124 is applied to an image 128, which represents the original, acquired image 106, or an image similar thereto, to obtain processed image 130.

Further microscopy images can be processed according to steps 102 and 104.

Figure 2:
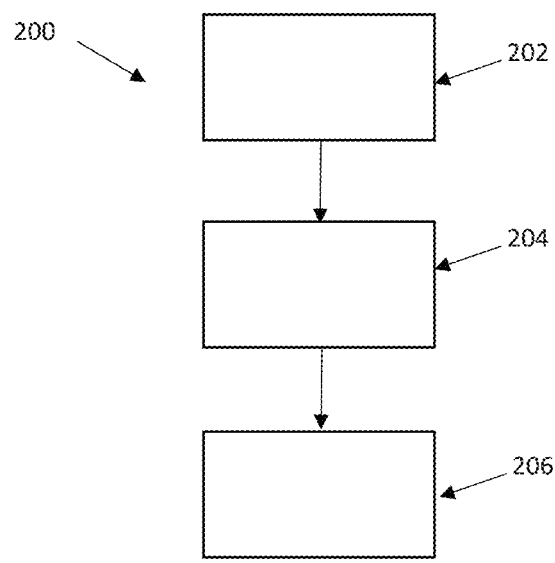
FIG. 2 illustrates a method for training a convolutional neural network according to a further embodiment of the invention.

FIG. 2 illustrates a method 200 for training a convolutional neural network according to a further embodiment of the invention. The method comprises receiving a captured image 202; generating a denoised image by applying the convolutional neural network to the captured image 204; and training the convolutional neural network based on a high frequency loss function, the captured image and the denoised image 206.

Figure 3:
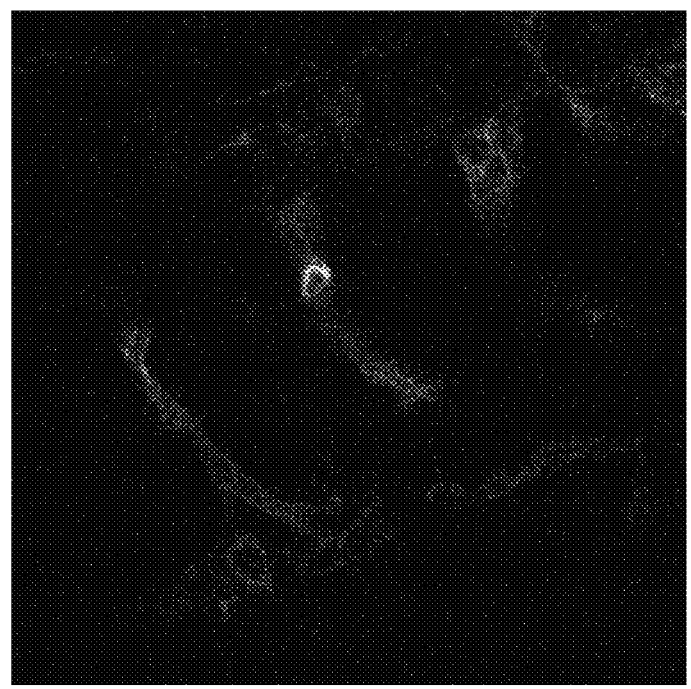
FIG. 3 is an acquired image before being processed.

FIG. 3 is an acquired image, for example a microscopy image, before being processed.

Figure 4:
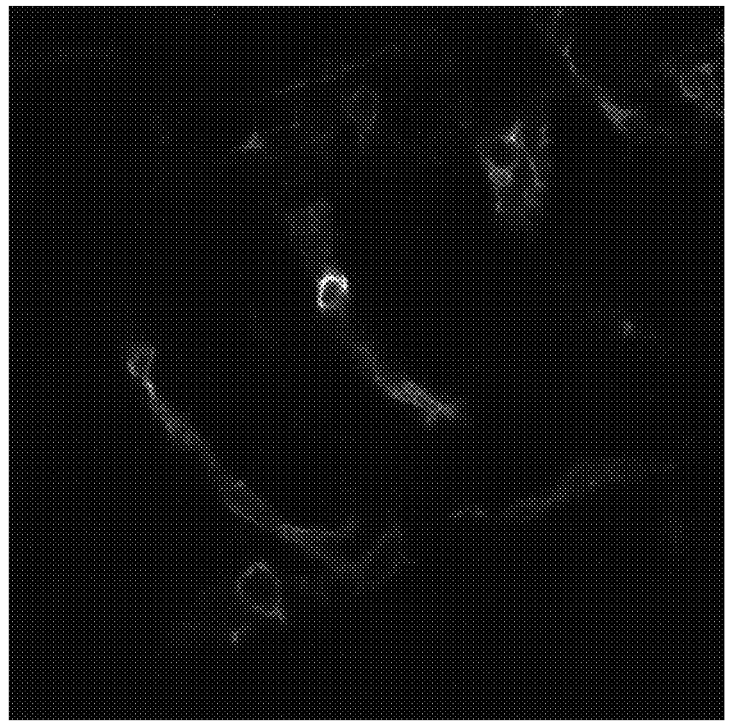
FIG. 4 is an image after being processing using a trained convolutional neural network trained according to an embodiment of the invention.

FIG. 4 is an image after being processing using a trained convolutional neural network trained according to an embodiment of the invention. It is apparent from the image in FIG. 4 that the SNR has been improved with respect to the acquired image.

Figure 5:
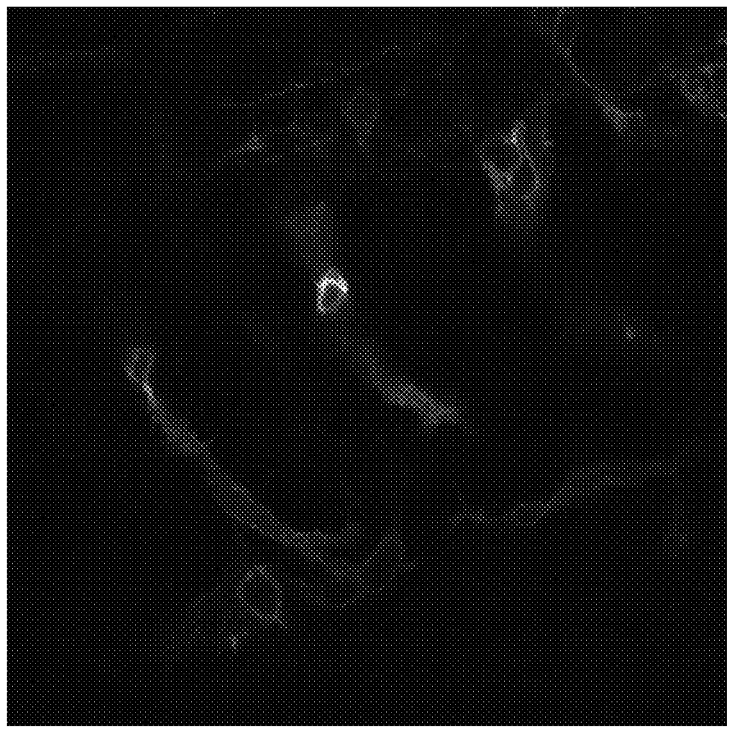
FIG. 5 is a ground truth of the acquired image.

FIG. 5 is a ground truth of the acquired image.

Figure 6:
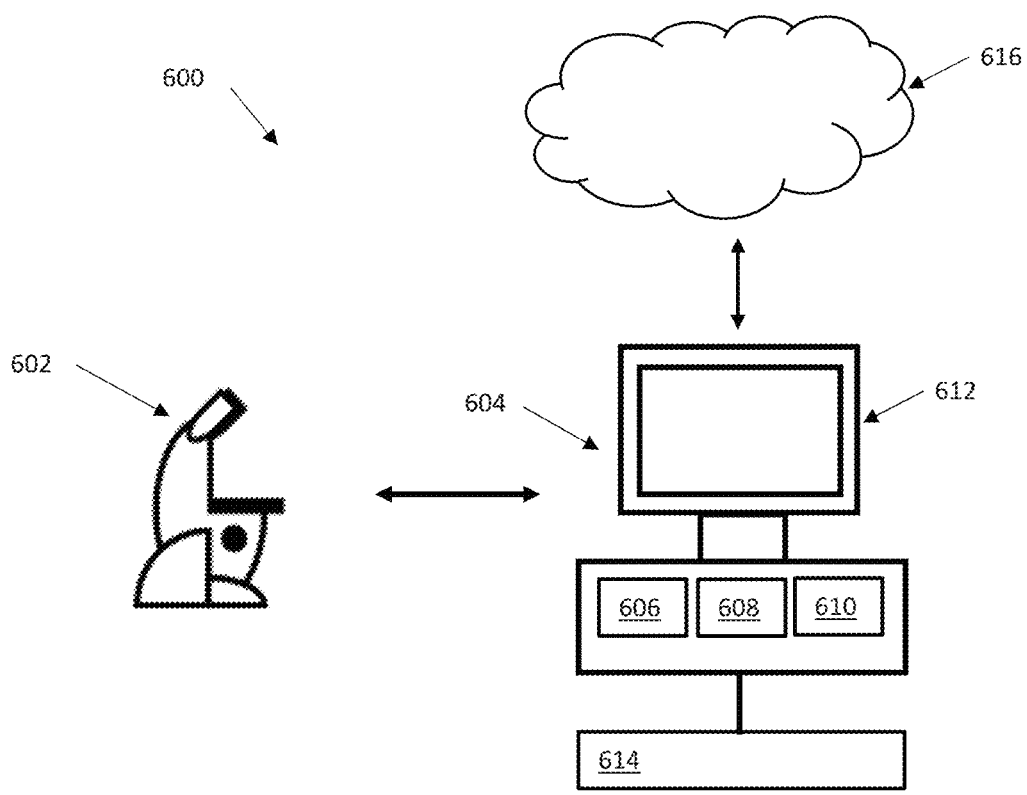
FIG. 6 illustrates a system for performing a method for training a convolutional neural network according to a further embodiment of the invention.

FIG. 6 shows a schematic illustration of a system 600 configured to perform a method described herein. The system 600 comprises a microscope 602 and a computer system 604. The microscope 602 is configured to take images and is connected to the computer system 604. The computer system 604 is configured to execute at least a part of a method described herein. The computer system 604 may be configured to execute a machine learning algorithm. The computer system 604 and microscope 602 may be separate entities but can also be integrated together in one common housing. The computer system 604 may be part of a central processing system of the microscope 602 and/or the computer system 604 may be part of a subcomponent of the microscope 602, such as a sensor, an actor, a camera or an illumination unit, etc. of the microscope 602.

The computer system 604 may be a local computer device (e.g. personal computer, laptop, tablet computer or mobile phone) with one or more processors and one or more storage devices or may be a distributed computer system (e.g. a cloud computing system 616 with one or more processors and one or more storage devices distributed at various locations, for example, at a local client and/or one or more remote server farms and/or data centers). The computer system 604 may comprise any circuit or combination of circuits. In one embodiment, the computer system 604 may include one or more processors 606, which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor 608, a digital signal processor (DSP), multiple core processor, a field programmable gate array (FPGA), for example, of a microscope or a microscope component (e.g. camera) or any other type of processor or processing circuit. Other types of circuits that may be included in the computer system 604 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 604 may include one or more storage devices 610, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 602 may also include a display device 612, one or more speakers, and a keyboard and/or controller 614, which can include a mouse, trackball, touch screen, voice-recognition device, or any other device that permits a system user to input information into and receive information from the computer system 604.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a preprocessing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 Pretraining step
102 Training step
104 Processing step
106 Acquired image
108 Random patches
110 Magnified section of a random patch
112 Random patches of the captured image comprising swapped pixel values
114 Magnified section of a random patch comprising swapped pixel values
116 Pretrained convolutional neural network (CNN)
118 Segmentation mask
120 Denoised image
122 Random patches of the denoised image comprising swapped pixel values
124 Trained convolutional neural network (CNN)
126 Function to be minimised
128 Acquired image similar to acquired image 106

130 Denoised image
200 Method for training a convolutional neural network
202 Receiving a captured image
204 Generating a denoised image by applying the convolutional neural network to the captured image
206 Training the convolutional neural network based on a high frequency loss function, the captured image and the denoised image
600 System
602 Microscope
604 Computer system
606 One or more processors
608 Graphics processor
610 One or more storage devices
612 Display device
614 Keyboard and/or controller
616 Cloud computing system

What is claimed is:

1. A computer-implemented method for training a convolutional neural network, the method comprising:
receiving a captured image;
generating a denoised image by applying the convolutional neural network to the captured image; and
training the convolutional neural network based on a high frequency loss function, the captured image and the denoised image,
wherein the high frequency loss function comprises a high pass filter function for applying to the captured image and the denoised image,
wherein the convolutional neural network was trained by:
dividing the captured image into random patches;
swapping pixel values in each random patch with neighbour pixel values; and
training the convolutional neural network based on the random patches of the captured image comprising swapped pixel values, and
wherein the convolutional neural network was trained by minimising a mean squared error of the convolutional neural network based on the random patches of the captured image comprising swapped pixel values.

2. The method of claim 1, wherein training the convolutional neural network comprises minimising a loss of the convolutional neural network together with a loss of the high frequency loss function.

3. The method according to claim 1, wherein training the convolutional neural network comprises training the convolutional neural network to recognize patterns absent from the denoised image and present in the captured image.

4. The method according to claim 1, wherein the high frequency loss function comprises a Laplacian of Gaussian function.

5. The method according to claim 4, further comprising applying Gaussian smoothing to the captured image and the denoised image before applying the Laplacian of Gaussian function.

6. The method according to claim 1, further comprising applying the trained convolutional neural network to the captured image.

7. The method according to claim 1, wherein the convolutional neural network is an encoder-decoder convolutional neural network.

8. The method according to claim 1, wherein training the convolutional neural network comprises:
dividing the captured image and the denoised image into random patches;
swapping pixel values in each random patch with neighbour pixel values; and
training the convolutional neural network based on the random patches of the captured image comprising swapped pixel values and the denoised image comprising swapped pixel values.

9. A system comprising one or more processors and one or more storage devices, wherein the system is configured to perform the method of claim 1.

10. The system of claim 9, further comprising an imaging device coupled to the processor for acquiring microscopy images.

11. A trained convolutional neural network trained by:
receiving captured images;
generating a denoised image by applying a convolutional neural network to the captured images; and
adjusting the convolutional neural network based on a high frequency loss function, the captured image and the denoised image to obtain the trained convolutional neural network,
wherein the high frequency loss function comprises a high pass filter function for applying to the captured image and the denoised image,
wherein the convolutional neural network was trained by:
dividing the captured image into random patches;
swapping pixel values in each random patch with neighbour pixel values; and
training the convolutional neural network based on the random patches of the captured image comprising swapped pixel values, and
wherein the convolutional neural network was trained by minimising a mean squared error of the convolutional neural network based on the random patches of the captured image comprising swapped pixel values.

12. A tangible, non-transitory computer-readable medium having instructions thereon, which upon being executed by one or more processors, facilitates performance of the method according to claim 1.

13. A computer-implemented method for training a convolutional neural network, the method comprising:
receiving a captured image;
generating a denoised image by applying the convolutional neural network to the captured image; and
training the convolutional neural network based on a high frequency loss function, the captured image and the denoised image,
wherein the convolutional neural network was trained by:
dividing the captured image into random patches;
swapping pixel values in each random patch with neighbour pixel values; and
training the convolutional neural network based on the random patches of the captured image comprising swapped pixel values, and
wherein the convolutional neural network was trained by minimising a mean squared error of the convolutional neural network based on the random patches of the captured image comprising swapped pixel values.

* * * * *